United States Patent [19]

Yamashita et al.

[11] Patent Number: 5,456,136
[45] Date of Patent: * Oct. 10, 1995

[54] CAM FOLLOWER WITH ROLLER FOR USE WITH ENGINE

[75] Inventors: Yasutaro Yamashita, Iwata; Kiyohito Nakamura, Kawachinagano; Toshihide Goto, Morimachi, all of Japan

[73] Assignee: NTN Corporation, Osaka, Japan

[*] Notice: The portion of the term of this patent subsequent to Nov. 12, 2008 has been disclaimed.

[21] Appl. No.: 137,222

[22] Filed: Oct. 18, 1993

Related U.S. Application Data

[63] Continuation of Ser. No. 690,215, Apr. 24, 1991, abandoned.

[51] Int. Cl.$^6$ ............................... F16H 53/06; F01L 1/14
[52] U.S. Cl. ............................... 74/569; 74/559; 123/90.5; 123/90.16; 123/90.39; 123/90.6
[58] Field of Search ................. 74/559, 569; 123/90.50, 123/90.51, 90.16, 90.6, 90.39; 384/625, 420, 450

[56] References Cited

U.S. PATENT DOCUMENTS

| | | | |
|---|---|---|---|
| 2,335,988 | 12/1943 | Anderson | 74/569 |
| 2,482,312 | 9/1949 | Bachle | 74/569 |
| 3,749,072 | 7/1973 | Schweikher | 123/193 C |
| 3,831,457 | 8/1974 | Kern | 74/569 |
| 4,031,777 | 6/1977 | Parks | 74/569 |
| 4,359,022 | 11/1982 | Nakamura et al. | 123/188 AA |
| 4,632,074 | 12/1986 | Takahashi et al. | 74/559 |
| 4,727,832 | 3/1988 | Miyamura et al. | 123/90.5 |
| 4,856,469 | 8/1989 | Okazaki et al. | 74/559 |
| 4,909,197 | 3/1990 | Perr | 74/569 |
| 4,987,865 | 1/1991 | Schenkel | 123/193 P |
| 5,064,298 | 11/1991 | Hibi et al. | 384/625 |

Primary Examiner—Carl D. Friedman
Assistant Examiner—Winnie S. Yip
Attorney, Agent, or Firm—Nikaido Marmelstein Murray & Oram

[57] ABSTRACT

A cam follower with a roller for use with an engine, the roller adapted for rolling contact with a cam on a camshaft. The roller is formed with minute recesses arranged in random directions so that an RMS(L)/RMS(C) ratio is not more than 1.0 wherein RMS(L) and RMS(C) are surface roughness root mean square values in the axial and circumferential directions, respectively. An SK value, another surface roughness parameter, should be not more than −1.6. This degree of roughness represents a higher surface roughness than prior art cam followers, provides greater oil retention and therefor better lubrication.

4 Claims, 6 Drawing Sheets

Conventional cam follower 50 hours

Cam follower of this invention 200 hours

CAM FOLLOWER WITH ROLLER FOR USE WITH ENGINE

This application is a continuation of application Ser. No. 07/690,215 filed Apr. 24, 1991 now abandoned.

BACKGROUND OF THE INVENTION

This invention relates to a cam follower with a roller for use with an engine, and more specifically to a cam follower which exhibits a long life irrespective of the lubricating conditions with respect to a cam surface of a cam shaft, and the hardness and surface roughness of the cam surface.

In improving the durability of the engine valve system and keeping it maintenance-free, lubrication and wear of a cam on the cam shaft and the cam follower present problems.

To prevent wear of the valve system, a hydraulic lash adjuster is usually used in an OHV type engine. Also, in order to reduce wear and friction loss on the cam surface and the cam follower surface, there is a growing tendency to adopt a rollable cam follower.

Among the engine parts, lubrication requirement is especially strict for such cam portions. Their contact surface is called a boundary lubrication region. With a cam shaft used in the region, its roller basically makes a rolling contact with respect to the cam. But since the revolving speed of its roller changes due to the shape of the cam or the load acting on the roller fluctuates sharply, it cannot make a pure rolling motion but makes a rolling contact accompanying sliding motion. This may cause peeling on the outer peripheral rolling surface of the roller of the cam follower, depending upon the lubricating conditions (amount of oil, oil temperature, and foreign matter) and the surface roughness of the mating cam, thus shortening its life.

It is well-known that the rolling life of the roller of the cam follower is greatly influenced by the surface roughness (R) of its rolling surface. Heretofore, it has been thought that the more smoothly the rolling surface is finished, the longer the life. But, the finished surface of the cam usually has an Rmax of 2–4 microns when finished by grinding. This is not satisfactory as a rolling contact surface. Thus, it is desired to increase the durability of the cam follower by preventing it from getting damaged.

SUMMARY OF THE INVENTION

An object of the present invention is to provide a long-life cam follower for use with an engine, which follower exhibits an excellent oil film formation while in rolling contact irrespective of whether or not the mating cam surface has a good roughness.

In accordance with the present invention, there is provided a cam follower with a roller adapted for rolling contact with a cam on a cam shaft of the engine, said roller being substantially cylindrical and having its outer peripheral surface formed with minute recesses arranged in random directions so that the distribution has an RMS(L)/RMS(C) ratio is $\leq 1.0$ on the average wherein RMS(L) RMS(C) are surface roughness root mean square values is recess depths in the axial and circumferential directions, respectively, and so that the SK value, which is another parameter of surface roughness distribution, is not more than $-1.6$.

This will improve the oil film formation ratio on its rolling surface and make it possible to form an oil film thick enough to prevent metal-to-metal contact at the rolling contact surface and to prevent peeling and wear on the rolling surface of the roller irrespective of the roughness of the mating cam surface. Thus, the life of the cam follower is increased.

DETAILED DESCRIPTION OF THE PREFERRED EMBODIMENT

Figure 1:
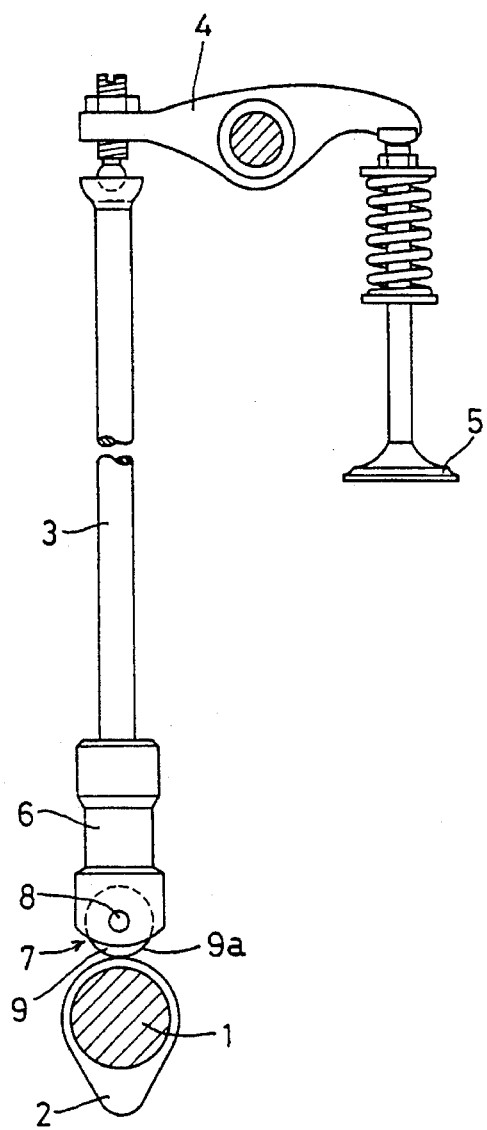
FIG. 1 a vertical sectional view of the first example in which the cam follower according to this invention is used.
Figure 2A:
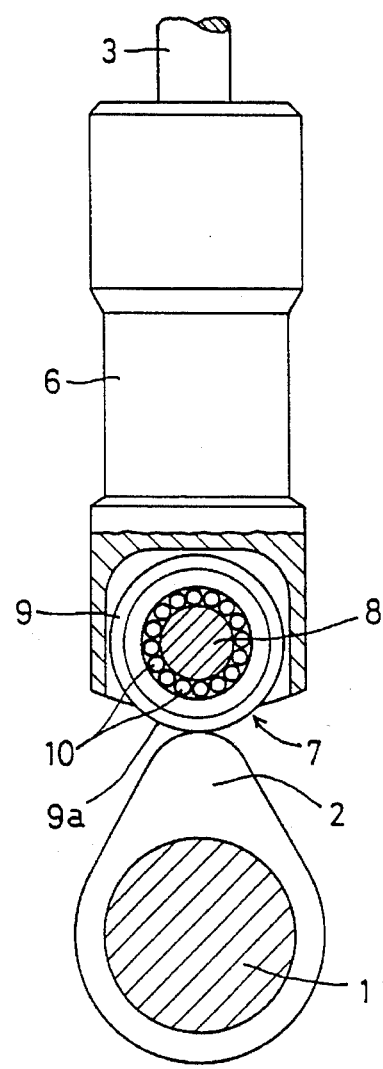
FIG. 2A is a partially cut-away sectional view of a portion of same.
Figure 2B:
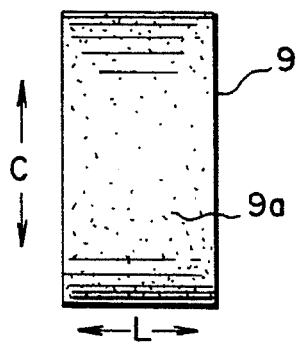
FIG. 2B is a view of roller 9 showing minute recesses of surface roughness.
Figure 3:
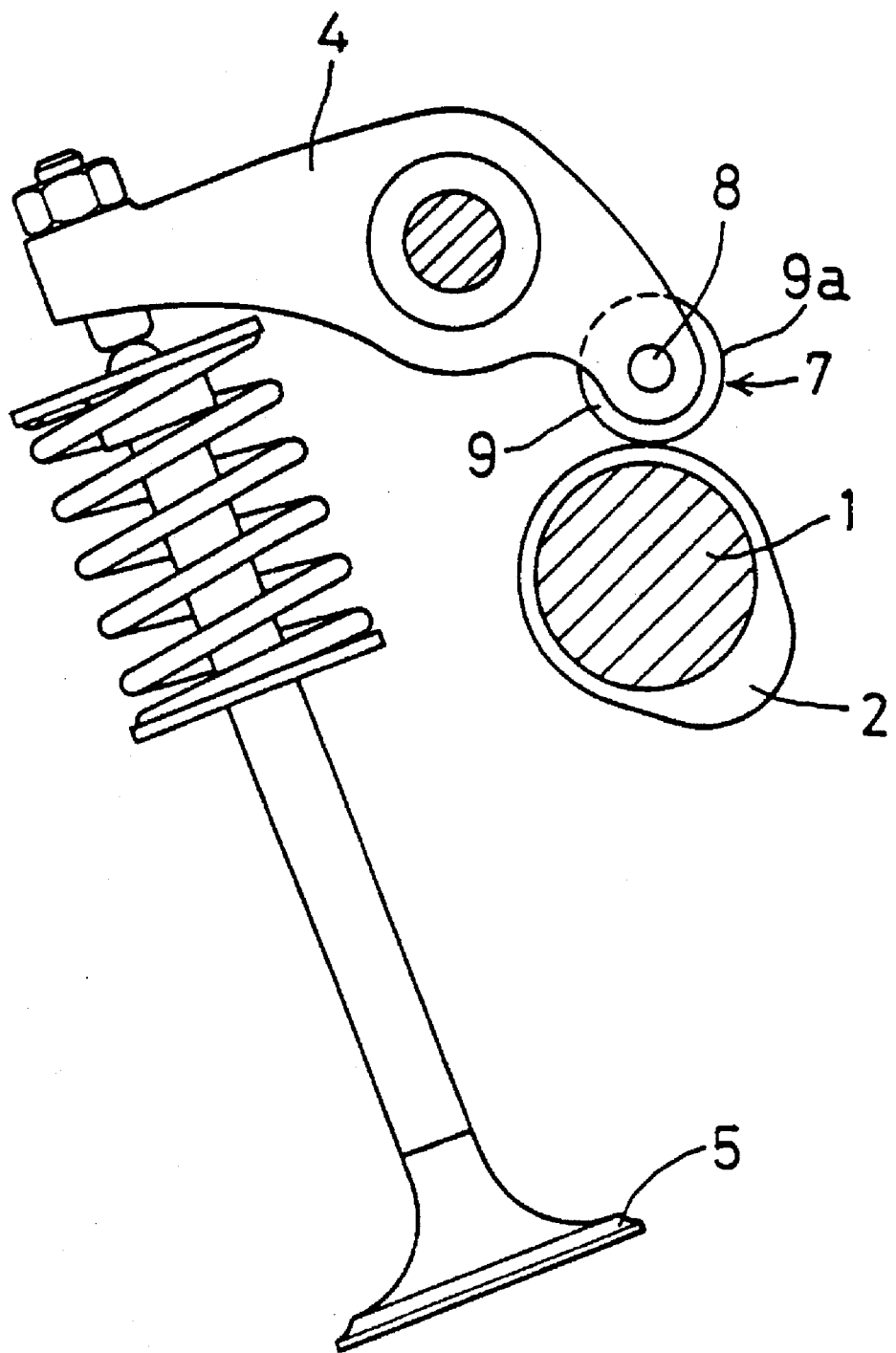
FIG. 3 is a vertical sectional view of the second example.

FIGS. 1–3 show how a cam follower with a roller is used with an engine.

FIGS. 1 and 2A show a cam follower used in an OHV type engine. In this arrangement, a push rod S is adapted to be moved up and down by a cam 2 on a cam shaft 1 and has its top end coupled to one end of a rocker arm 4 to pivot it to open and close a valve 5 coupled to the other end of the rocker arm 4. A cam follower 7 is mounted on the bottom end of a hydraulic lash adjuster 6 provided at the bottom of the push rod S for rolling contact with the peripheral surface of the cam 2.

FIG. 3 shows a cam follower used in an OHC type engine. The rocker arm 4 is pivoted directly by the cam 2 on the cam shaft 1. The valve 5 is opened and closed with the rocking motion of the rocker arm 4. A cam follower 7 is mounted on the end of the rocker arm 4 near the cam 2 for rolling contact with the peripheral surface of the cam 2.

In FIG. 2A, the cam follower 7 is of a rolling type having a hollow cylindrical roller body 9 fitted on a support shaft 8 through needle rollers 10. But it may be of a slide type in which the roller is directly fitted on the support shaft.

Also, though not shown, the rolling surface of the roller 9 may be flat, cut-crowned or full-crowned.

According to the present invention, the rolling surface of the roller body 9 of the cam follower 7 is formed with minute recesses 9a arranged in random directions as shown in FIG. 2B. If surface roughness is expressed in terms of a parameter RMS, they should be arranged so that the ratio RMS(L)/RMS(C) will be not more than 1.0 on the average wherein RMS(L) and RMS(C) represent the root mean square values of surface roughness of recesses in the outer peripheral surface in the axial and circumferential directions, respectively. The SK value, which is another parameter of surface roughness, should be $\leq -1.6$ on the average both in the axial and circumferential directions.

The outer peripheral surface having such a roughness as defined above can be formed by barreling.

The SK value is a parameter that represents the skewness of a curve showing distribution of surface roughness. If the roughness distribution forms a symmetrical curve as with a Gauss distribution curve, the SK value will be zero. It has been found that the shape and distribution of the minute recesses will be the best for the formation of oil film if the SK values in the axial and circumferential directions are not more than −1.6.

By finishing the outer peripheral surface as defined above, even if the mating cam surface is poorly finished, a sufficiently thick oil film can be formed stably, thus minimizing metal-to-metal contact at the rolling contact surface.

With the reduction in metal-to-metal contact, the outer peripheral surface of the roller can be protected against damage, peeling and abnormal wear and flaking. Thus the durability will improve.

The roller according to this invention and an ordinarily ground and super-finished roller were actually mounted on an engine to test them for oil film forming ability. The test results revealed that the outer peripheral surface of the roller according to this invention has an excellent oil forming ability.

As to the relation between the surface condition and the oil film formation at the rolling contact surface, grinding which leaves axial ground marks is preferable to ordinary cylindrical grinding.

It is believed that the minute grooves formed by the axial grinding serve as oil dams and supply oil to the contact portion.

Figure 4A:
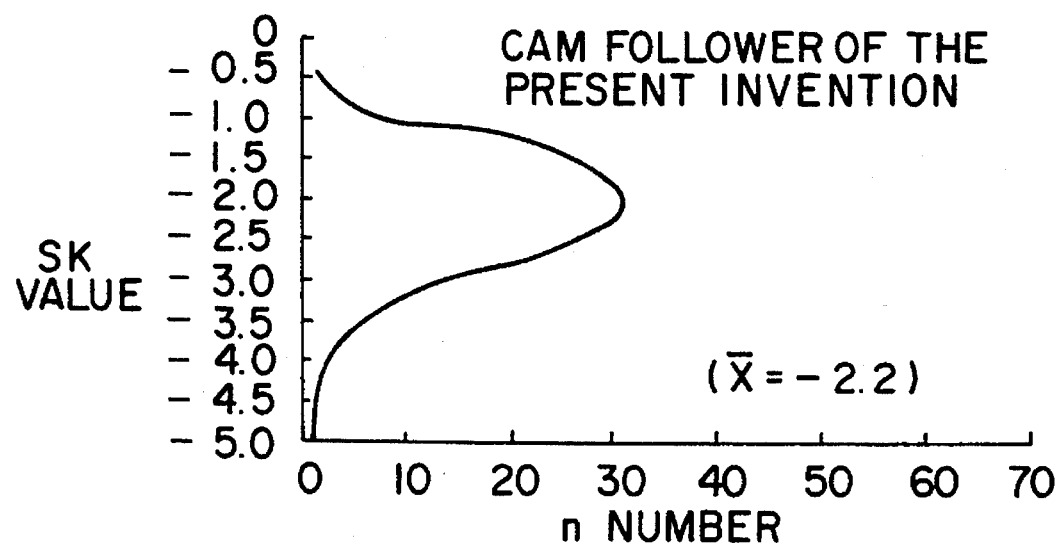
FIGS. 4A, 4B, 4C and 4D are graphs showing the data on distribution of the RMS and SK values for the cam follower according to this invention and a conventional one.
Figure 4B:
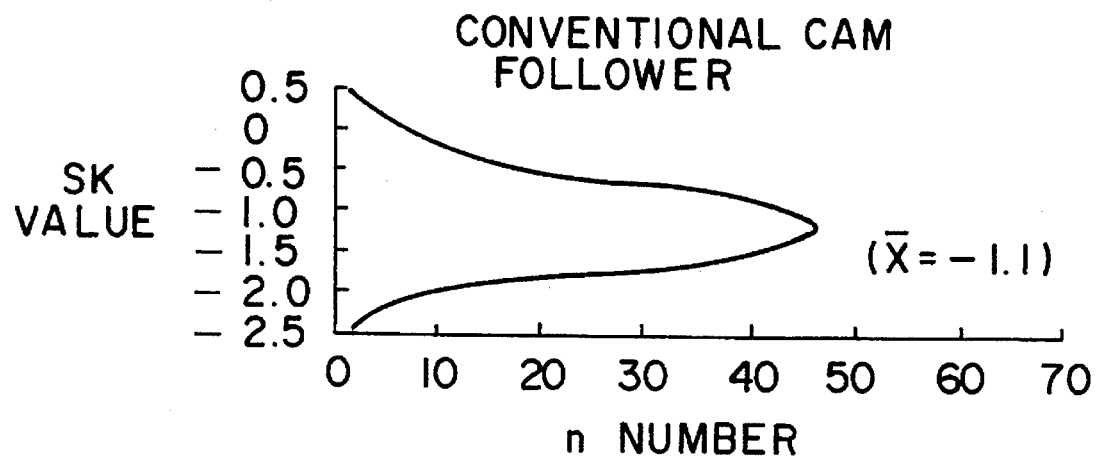
Figure 4C:
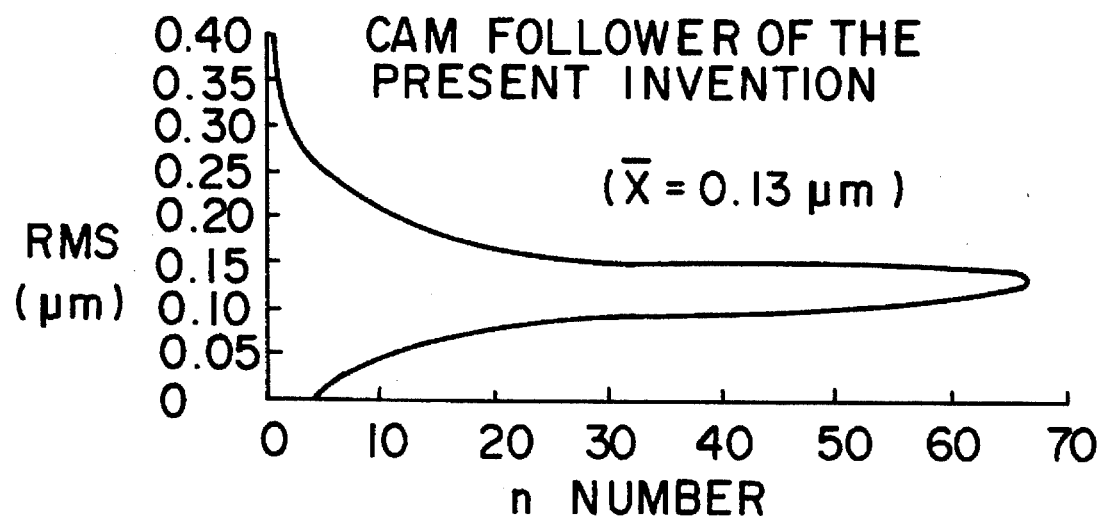
Figure 4D:
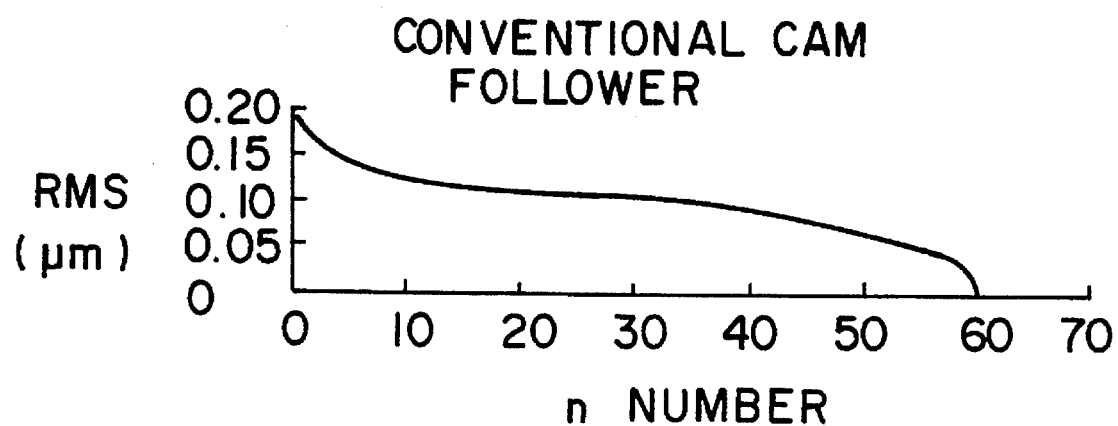
Figure 5:
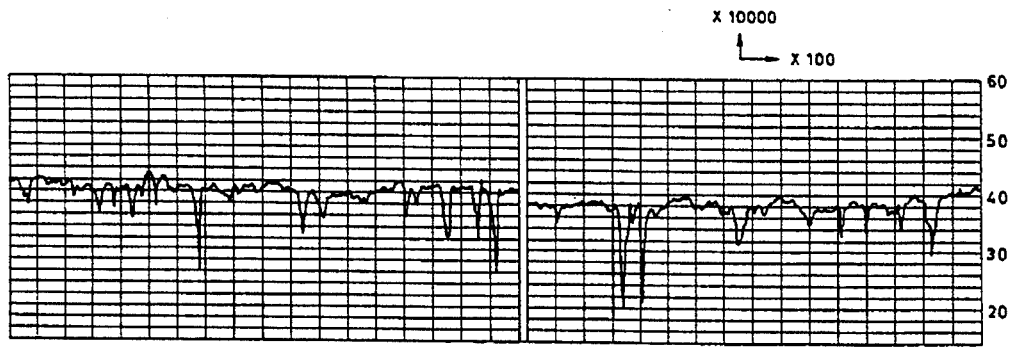
FIG. 5 is a graph showing the surface finished condition of the roller of the cam follower according to this invention.

FIGS. 4A, 4B, 4C and 4D show the distribution of the RMS and SK values on the outer rolling surface of the roller of a prior art cam follower and that of the cam follower according to the present invention wherein n represents the number of specimens tested. As shown in FIG. 4C, average RMS roughness of a cam follower roller body of the present invention is 0.13 μm, as compared with 0.055 μm, for a conventional cam follower. FIG. 5 shows the roughness of finished surface of the rolling surface of the roller of the cam follower according to this invention.

Next, the results of the life test made on a prior art cam follower and the cam follower according to the present invention will be described.

Table 1 shows the details of the outer peripheral surface of the cam follower used for the test. Table 2 shows the results of the test.

Figure 6:
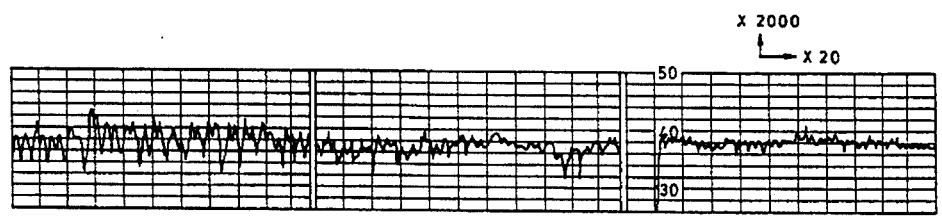
FIG. 6 is a graph showing the roughness of the mating cam surface.

Test conditions are shown below. FIG. 6 shows the roughness of the mating cam surface.
(1) Engine used for the test:
 OHCI end-pivot type rocker arm
(2) Cam follower tested:
 17 mm in external diameter×7.5 mm wide×8.3 mm in the inscribed circle diameter of roller
(3) Operating conditions:
 Engine speed: 8000 rpm
 Engine oil temperature: 125° C.

Figure 7:
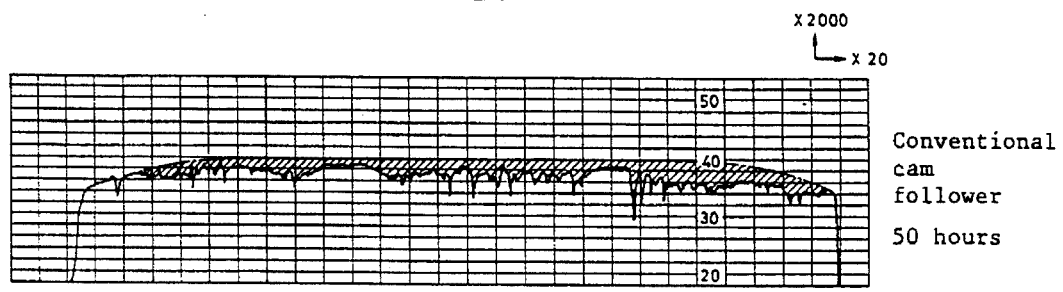
FIG. 7 is a graph showing the test results for a prior art cam follower.

As is apparent from the results shown in Table 2, with the surface roughness of the cam surface being Rmax of 1–4 microns, the prior art cam follower developed peeling and wear considerably even in 50 hours. As shown in FIG. 7, the hatched portion shows a portion worn due to peeling.

Figure 8:
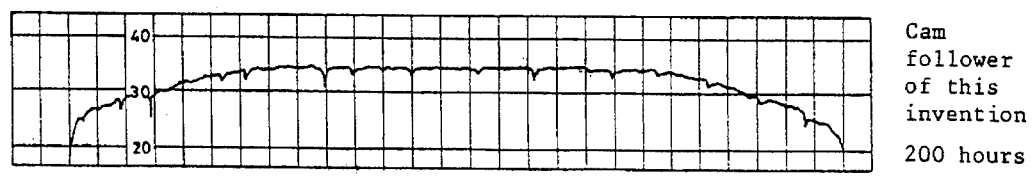
FIG. 8 graph showing the test results for the cam follower according to this invention.

In contrast, as shown in FIG. 8, the cam follower according to this invention showed no abnormality even after 200 hours when used with the mating cam surface having an Rmax of 2–4 microns. This shows that it has a very high durability and oil film was formed sufficiently. As for the surface roughness of the cam surface, there was no significant difference between both cam followers. In both cases, the cam surface was rounded off as a result of removal of projections.

Figure 9:
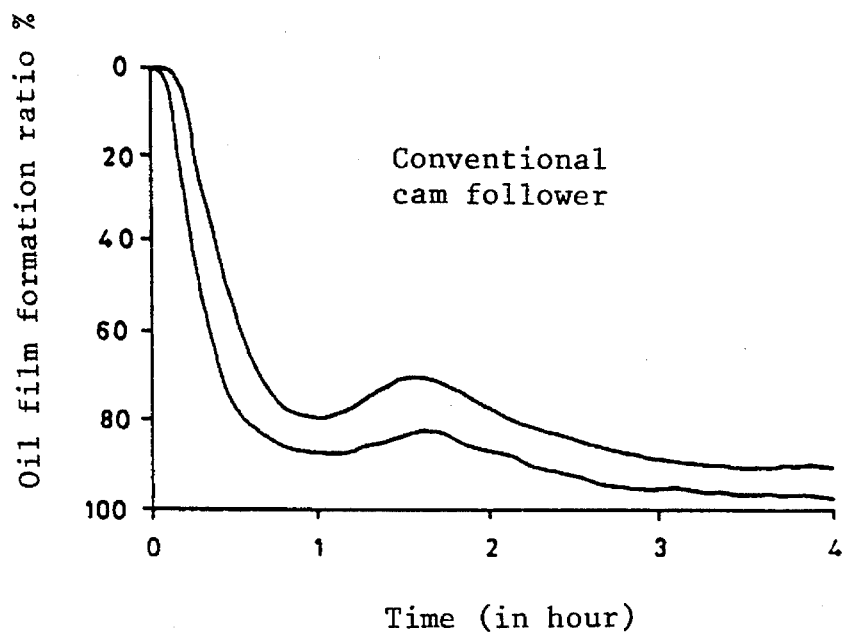
FIGS. 9 and 10 are graphs showing oil film formation ratios on a conventional cam follower and the one according to the present invention, respectively.
Figure 10:
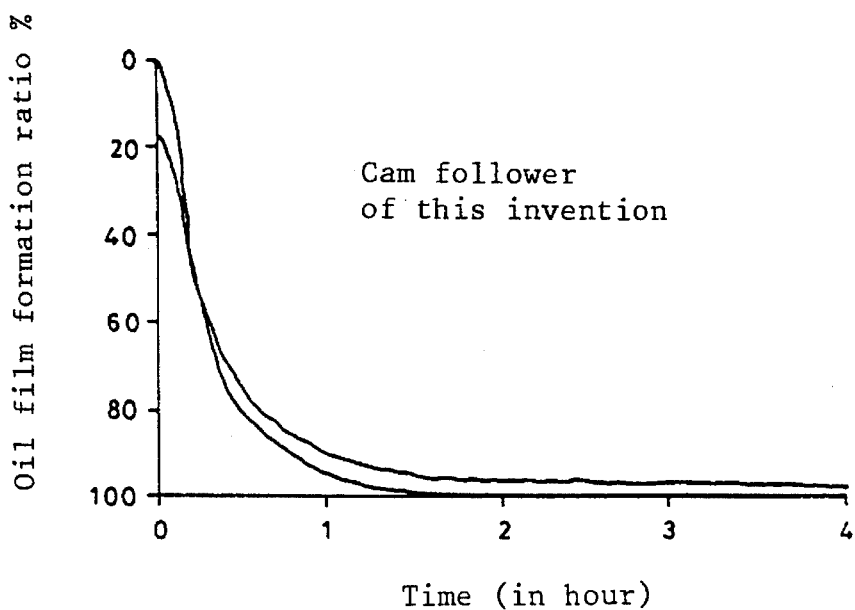

FIGS. 9 and 10 show the oil film formation ratios measured in this test. The oil film formation ratio on the finished surface of the test cam follower according to the present invention was about 20% higher than that of the prior art cam follower at the beginning of operation.

Also, it was confirmed that an oil film forms substantially completely when load is applied $1.2 \times 10^5$ times.

Although no data are shown, this arrangement is effective in reducing the sliding wear coefficient at the contact portion between the side surfaces of the roller and the rocker arm.

TABLE 1

| Cam follower | Roller surface | RMS μm | | L/C (average value) | SK value (average value) |
|---|---|---|---|---|---|
| | | L | C | | |
| Prior art | Ground and super-finished | 0.04–0.06 | 0.03–0.05 | 1.0–1.5 | −0.8—1.2 |
| Present invention | Treated as defined | 0.09–0.16 | 0.10–0.16 | 0.7–1.0 | −1.6—2.3 |

TABLE 2

| Cam follower | Pieces tested | Cam surface roughness in Rmax | Judgement | Condition of surface of roller | |
|---|---|---|---|---|---|
| | | | | after 50 hours | after 200 hours |
| Prior | 9 | 1–2 Mm | x | peeling | peeling |

TABLE 2-continued

| Cam follower | Pieces tested | Cam surface roughness in Rmax | Judgement | Condition of surface of roller after 50 hours | after 200 hours |
|---|---|---|---|---|---|
| art | 3 | 2–3 Mm | x | damage observed | damage observed |
| | 6 | 3–4 mM | x | | |
| Present invention | 10 | 3–4 Mm | ⊙ | No peeling or damage observed | No peeling or damage observed |

(In judgement column, x indicates the existence of peeling and ⊙ does no peeling.)?

What is claimed is:

1. A cam follower for an engine having a camshaft with a cam, comprising:

a hollow cylindrical roller body having an outer circumferential surface which for contacting said cam of said camshaft of the engine;

a support shaft, extending through said hollow cylindrical roller body in a direction of an axis of said hollow cylindrical roller body, for supporting said hollow cylindrical roller body; and rolling elements disposed between said hollow cylindrical roller body and said support shaft and rotatable therebetween to support said hollow cylindrical roller body;

said outer circumferential surface of said hollow cylindrical roller body being formed with minute recesses in random directions so that root mean square values of roughness have an RMS(L)/RMS(C) ratio≦1.0 on average, wherein RMS(L) and RMS(C) are roughness root mean square values of recess depths in axial and circumferential directions, respectively, of said outer circumferential surface of said hollow cylindrical roller body, and so that an SK value, which is a parameter defining distribution of surface roughness, is ≦−1.6, such that said minute recesses serve as oil sumps for making more reliable oil film formation on rolling contact surfaces of said outer circumferential surface of said hollow cylindrical roller body and said cam of the camshaft.

2. A cam follower according to claim 1, wherein said roller body outer circumferential surface roughness has an average RMS value of substantially 0.13 μm.

3. A cam follower with a roller for opening and closing an engine valve of an engine, said engine having a camshaft with a cam, said roller comprising:

a roller body;

a shaft for supporting said roller body; and rolling elements mounted between said roller body and said shaft, said roller body having an outer circumferential surface for contacting said cam of said camshaft of the engine through an oil film of engine oil, said outer circumferential surface of said roller body being formed with minute recesses in random directions so that root mean square values of roughness have an RMS(L)/RMS(C) ratio ≦1.0 on average, wherein RMS(L) and RMS(C) are roughness root mean square values of recess depths in axial and circumferential directions, respectively, of said outer circumferential surface of said roller body, and so that an SK value, which is a parameter defining distribution of surface roughness, is ≦−1.6, such that said minute recesses serve as engine oil sumps for making more reliable oil film formation on rolling contact surfaces of said roller body and said cam of the camshaft.

4. A cam follower according to claim 3, wherein said roller body outer circumferential surface roughness has an average RMS value of substantially 0.13 μm.

* * * * *